Figure 1:
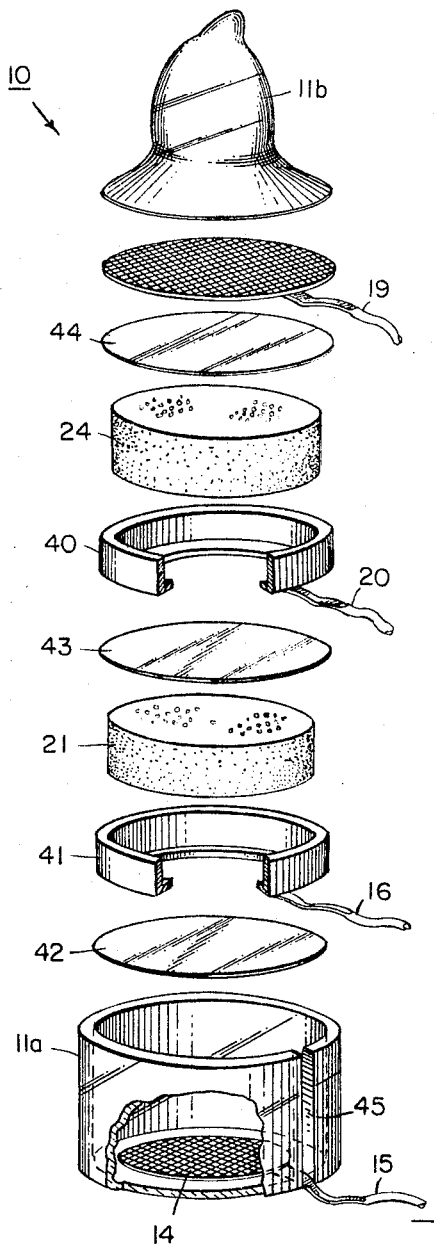

Sept. 13, 1966  H. R. BROADLEY ETAL  3,273,026
SOLION CELL HAVING ELECTRODES COLD-SEALED WITH CONTAINER WALL
Filed April 2, 1963

INVENTORS
HARRY R. BROADLEY
WILLIAM R. GRAMS
BY
*W. J. Shanley Jr.*
THEIR ATTORNEY.

United States Patent Office 3,273,026
Patented Sept. 13, 1966

3,273,026
SOLION CELL HAVING ELECTRODES COLD-SEALED WITH CONTAINER WALL
Harry R. Broadley, Reading, Mass., and William R. Grams, Ballston Spa, N.Y., assignors to General Electric Company, a corporation of New York
Filed Apr. 2, 1963, Ser. No. 269,965
17 Claims. (Cl. 317—230)

This invention relates to electrochemical devices, and more particularly, to an improved solion which is easier to construct, more reliable and is more accurate in operation.

A solion is an electrochemical cell utilizing an electrolytic solution which enters into a reversible electrochemical reaction at its electrodes under preselected operating conditions. One of the characteristics of such devices which makes them useful is their ability to reliably integrate applied electrical signals. This ability is dependent upon the maintenance or storage of any given concentration of ions within the integral compartment for a long period of time without change when no input signal is being applied to the device. This means that the concentration of ions formed in the integral compartment at the common electrode, which is proportional to the charge applied to the device, must not increase or decrease due to the drift of ions into or out of the integral compartment since this would lead to erroneous readout indications. A great deal of effort has been directed toward improving the design of solions in order to facilitate their construction, as well as make them more reliable and accurate. Since these devices are precision devices requiring the assembly of extremely small parts with very small tolerances, much effort is directed toward facilitating their manufacture and assembly without requiring a lot of critical hand operations.

In the prior copending application of Harry R. Broadley, Ser. No. 269,262, filed April 1, 1963 and assigned to the same assignee as the present invention, there is disclosed and claimed a solion device which is characterized by the use of cup-shaped electrodes supported with the sides of the electrodes in contact with the inner walls of the container.

This invention relates to devices of this character and it has for one of its objects to effect certain improvements in construction that render such devices more reliable and more accurate.

The shield and readout electrodes of the devices of the type disclosed in the Broadley application are carried by non-resilient glass frit disks. As is discussed in more detail in the Broadley application, it is desirable to be able to bring the sides of the readout and shield electrodes into very intimate contact with the inner walls of the container. This is accomplished, in accordance with the Broadley application, by evacuating and heating the entire container so as to collapse the container around the stacked elements and bring the inner wall of the container into intimate contact with the elements. This heating and collapsing operation is a troublesome operation which requires the skills of a person who is very experienced in handling glass since the application of too much heat might result in destroying the porosity of the glass frits, thus rendering the device useless.

It is therefore an object of this invention to bring the readout and shield electrodes into intimate contact with the inner walls of the container without requiring a heating and collapsing operation.

In the prior copending Broadley application, the integral compartment was formed by spacing the sputtered platinum electrode from the common electrode by a contact spacer ring arrangement. It has been found that sometimes in the assembly operation, or at a later time, a small piece of frit carrying some sputtered platinum breaks off from the readout electrode and forms a bridge between the readout electrode and the common electrode. This usually results in shorting the device thus necessitating the discarding of the entire device since the interelectrode space in the integral compartment is of the order of 3 mils and is thus easily bridged.

It is therefore an object of the invention to improve the construction of the integral compartment so as to prevent pieces of frit from forming a bridge between the electrodes.

It is also highly desirable from a production standpoint to simplify the construction of solion devices so as to reduce their cost and improve their reliability. The container body of the device of the Broadley application is formed by a molding operation in which the common electrode, its lead, and the lead for the readout electrode are molded into the body of the container. The molding of the common electrode assures that the entire common electrode is firmly anchored to prevent it from shorting to the readout electrode. This requires special tooling and facilities for performing the molding operation and it would be highly desirable from a production standpoint to eliminate the necessity for molding the common electrode and the leads into the container.

It is therefore an object of the invention to obtain electrical connections to the readout and common electrodes and to position the common electrode with respect to the readout electrode without requiring a molding operation.

The establishment of connections to the electrodes also involves the question of how to maintain a seal around the leads to the electrodes as the container and leads cool. Two of the common, chemically inert materials from which the container and the electrodes, respectively, are formed are Pyrex glass and platinum. These materials have different coefficients of thermal expansion thus making it difficult to bring the platinum leads out through the Pyrex and maintain a seal around the leads. In the prior copending Broadley application, this problem was overcome by inserting a tungsten section of wire in series with the platinum lead. This provided the required seals since tungsten can be sealed to Pyrex glass as tungsten and Pyrex have similar coefficients of thermal expansion. However, this requires a platinum-tungsten-platinum butt weld joint for each of the electrode leads. It would thus be highly desirable to be able to dispense with the necessity for splicing in other conductors in series with the leads in order to obtain the required seal.

It is therefore an object of the invention to provide improved methods and techniques for bringing the electrode leads through the walls of the container.

In the prior copending Broadley application, the shield electrode lead which came out of the top of the container necessitated the notching out of a small peripheral section of the glass frit that supports the shield electrode. This tended to aggravate the drift problem since it provided an avenue for the leakage of electrolyte around the shield electrode which was difficult to close during the heating and collapsing operation. As was more completely discussed in the prior copending Broadley application, this leakage which by-passes the shield electrode results in allowing ions of the measured species to enter the barrier space with an attendant loss of accuracy of the device. It is therefore desirable to make provisions for bringing the leads out of the device which will dispense with the necessity for notching other elements of the device.

It is therefore an object of the invention to provide electrical connections to the electrodes of the device without necessitating the notching of elements of the stacked array within the container.

Figure 2:
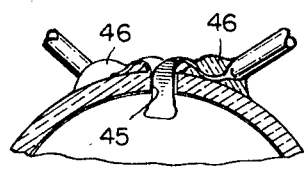

These and other objects and advantages of the invention may best be understood by the following description taken in conjunction with the accompanying drawings in which:

FIG. 1 is an exploded perspective view of the preferred embodiment of this invention; and FIG. 2 is an enlarged sectional view of the slot in the container showing the manner in which the electrode leads are brought out of the container and ultimately sealed.

Briefly described, this invention contemplates bringing the readout and shield electrodes into intimate contact with the inner walls of the container by utilizing a contact cup which cooperates with the sputtered frit and the inner walls of the container to provide the required seal without necessitating the heating and collapsing operation. Furthermore, the wedging action between the walls of the container, the contact cup, and the sputtered platinum electrode provides a reliable low-resistance contact to the readout and shield electrodes.

It is also contemplated that the construction of the integral compartment be improved so as to prevent the formation of bridges by loose pieces of platinum-bearing frit between the readout and common electrodes. This is accomplished by utilizing quartz paper spacers between the readout and common electrodes. Quartz paper spacers may also be utilized between the readout electrode-bearing frit and the shield electrode contact cup, as well as between the shield electrode frit and the input electrode. This simplifies the sputtering procedure used in preparing the shield and readout electrodes since the entire peripheral region of both frits may be completely sputtered without fear of shorting to either the input electrode or the shield electrode contact cup. This also leads to the establishment of a longer path, one side of which is defined by either the shield or readout electrodes, thus assuring the reduction of ions of the measured species.

It is another feature of the invention that utilization of a quartz paper spacer between the electrodes of the integral compartment also permits the elimination of the procedure utilized in the Broadley application wherein the common electrode and the common electrode and readout electrode leads are molded into the body of the container. Thus, a standard cup-shaped Pyrex container may be utilized. A slot may then be created in the wall of the container so as to receive the electrode leads of elements stacked within the cup-shaped container. Bringing the electrode leads radially outward through the slot also dispenses with the necessity for notching elements within the container, thus only one element; i.e., the container, need be notched instead of a plurality of elements as in the prior copending Broadley application. The slot in the container may then be sealed by dropping molten glass within the slot and applying a slight vacuum to pull the molten glass into contact with the internal elements of the device.

It is a further feature of the invention, that the portion of the electrode leads within the wall of the container is flattened so that the Pyrex glass of the container remains sealed to the electrode leads during the cooling of the assembly. This is thought to occur due to the fact that the resulting thin portion is resilient enough to follow the movement of the Pyrex container instead of resisting the movement during cooling thus breaking the interposed seal.

Referring now to the drawings, there is shown a solion device 10, the component parts of which will bear reference numerals which are the same as the corresponding elements of the copending Broadley application.

The limiting factor with respect to accuracy of solion devices of this type is governed by the amount of leakage of the measured species into the barrier space. Measured species, which in the case of a potassium iodide-iodine redox system will be the iodine ion, enters the iodine-free barrier space by leaking between the walls of the container and the portion of the shield and readout electrodes which are sputtered on the peripheral area of the glass frit disks. The term iodine ion, as hereinafter used, refers to the tri-iodide ion.

Contact cups 40 and 41, respectively, provide means for establishing a low resistance connection between the shield and readout electrodes and their corresponding leads. Cups 40 and 41 may be punched and drawn from 3 mil sheet stock in a single acting die which provides a large aperture in the bottom of both cups so as not to interfere with the ionic conduction. Cups 40 and 41 have outwardly flaring sides that are urged into intimate contact with the inner surface of the container when the electrode-carrying disks are inserted in place within their corresponding cups. The resulting wedging action serves two functions; the first being to automatically provide a low resistance contact between the cup and the electrode, and the second being to force the sides of the cup into intimate contact with the interior of the container thus minimizing leakage.

Quartz paper spacer 42 provides means for preventing dislodged frit from shorting readout electrode 21 to common electrode 14. In the preferred embodiment of the invention, quartz paper spacer 42 is made of 3 mil stock and thus establishes the interelectrode spacing of the integral compartment at 3 mils. Paper spacer 42 determines this dimension since the outside diameter of the common electrode 14 is less than the diameter of the aperture in the lower surface of readout electrode 41. Paper spacer 42 will be held in intimate contact with common electrode 14 to prevent the movement of this electrode and to determine the interelectrode distance as long as the total thickness of the common electrode and spacer disk 42 is greater than the total thickness of cup 41 and the spacer disk. In the preferred embodiment of this invention, this condition will exist as long as the common electrode is 3 mils or greater in thickness.

Paper spacers 43 and 44 provide means for insulating the upper edges of shield electrode 24 and readout electrode 21, respectively, from the adjacent conductive element. Thus, these electrodes do not have to terminate short of the upper surface of the glass frit as was the case in the device of the Broadley application, and furthermore, this configuration results in defining a longer path through which the measured species must pass before reaching the barrier space. Such construction thus increases the chance that any measured species leaking around the readout and shield electrodes will be reduced before entering the barrier space.

During the stacking of the elements within cup 11a, the electrode leads will be brought out of the container via slot 45 which, in the preferred embodiment of the invention, is 20 mils wide. When this operation is complete, top portion 11b is urged against the stacked array and sealed to portion 11a in any convenient manner. Reference may be had to the prior copending Broadley application for an example of the manner in which the top 11b may be sealed to the bottom portion 11a of the container.

In the preferred embodiment of the invention, leads 15, 16, 19 and 20 are comprised of 5 mils diameter platinum wire with the portion within the slot being flattened to .5 mil.

Referring now to FIG. 2, these leads are next alternately tacked to opposite sides of slot 45 by utilizing a glass cane and torch to drop molten glass on each lead so as to form portion 46 which spans the junction between the flattened portion of the leads and the round portion of the leads for mechanical strength. This not only properly fixes the position of the leads prior to the later operation when slot 45 is sealed, but it also constitutes the first step of the later sealing operation by defining the outer extremities of the glass added for sealing purposes. After the leads are tacked to alternate sides of slot 45, the slot is then covered with molten glass (not illustrated) by moving a cane and torch above the slot so as to drop molten glass therein. This glass applied directly to the slot should meet with and join portion 46 so as to completely enclose the flattened portion of each lead, as well as the entire length of the slot.

At this point, the container is placed under a low vacuum and the torch is then run in proximity to the glass covering the slot so as to make it molten enough to respond to the pressure which draws the molten glass down into the bottom of the slot in intimate contact with the elements within the container. The application of heat to the glass over the slot is not a critical operation as far as its heating effect upon the glass frits are concerned due to the fact that it is only locally applied.

Reference may be had to the prior copending Broadley application for a more complete description of the frit sputtering operation, the construction of the input and common electrodes, and the type of glass utilized in constructing the container, as well as the glass frits.

Even though this invention has been described with reference to the prior copending Broadley application, it should be recognized that the invention is equally applicable to any solion device utilizing cup-shaped shield and readout electrodes which are supported on nonresilient members so as to define the opposite extremities of the barrier space of the device. In accordance with the invention, these types of devices may be rendered more reliable, easier to construct, and may be made to display improved accuracy by utilizing cup-shaped contacts and quartz spacer elements in combination with a slotted member which may receive radially extending electrode leads emanating from the stacked array of elements.

While there has been described what is at present considered to be a preferred embodiment of the invention, it will be apparent to those skilled in the art that various changes and modifications may be made therein without departing from the spirit and scope of the invention.

What we claim as new and desire to secure by Letters Patent of the United States is:

1. An electrical readout integrator comprising a container, a redox electrolytic solution in said containers; a plurality of spaced electrodes within said container comprising a common electrode, a read-out electrode, an input electrode and a shield electrode; porous insulating means interposed between said input and shield electrodes, said porous insulating means having two opposed surfaces and an encompassing peripheral surface, said shield electrode being disposed on one of said opposed surfaces and at least a portion of said peripheral surface; a conductive cup-shaped element contacting said shield electrode and having a large centrally located aperture in the bottom thereof, said shield electrode and said supporting porous insulating means being firmly wedged into said cup-shaped element to provide a reliable low resistance contact with said shield electrode; first and second conductive leads passing through the wall of said container, said leads being connected to said cup-shaped element and said input electrode to provide externally available connections to said electrodes; and third and fourth conductive leads being connected to said common and read-out electrodes.

2. The combination of claim 1 in which the side portion of said cup-shaped element is wedged into intimate contact with the walls of said container to minimize the leakage of electrolyte out of said reservoir compartment between the wall and said element and to further assure that any electrolyte which will leak along this path will have to pass in intimate contact with said conductive element.

3. The combination of claim 2 in which said side is tapered outwardly from the bottom of said element to provide said wedging action, said peripheral surface being normal to said one opposed surface, the height of the said side being less than the thickness of said insulating means.

4. The combination of claim 3 further comprising a second porous insulating means which is interposed between and in contact with said first porous insulating means and said input electrode, said first porous insulating means comprising a glass frit disk, said second insulating means providing additional insulation and preventing the movement of any frit material that might become dislodged from said glass frit disk.

5. The combination of claim 4 in which the said second porous insulating means comprises a quartz paper spacer, said glass frit disk and container are a chemical inert glass, and said electrodes are taken from the class consisting of platinum and its noble metal alloys.

6. The combination of claim 5 in which said conductive lead connected to said shield electrode passes in a radial direction directly out of said container thus dispensing with the necesisty for providing slots in the periphery of said glass frit disk and quartz paper spacer and alleviating the problem associated with leakage of the electrolyte through said slots.

7. The combination of claim 6 in which said electrodes and leads are of platinum, said container is Pyrex glass, said leads being entirely of platinum throughout their length from their corresponding electrode to a point external of the container, the portion of said leads traversing said wall being sufficiently thin to expand and contract with the expansion and contraction of the walls of the container during the manufacture of said device and later during its normal usage to thus provide a seal between the platinum conductive leads and the Pyrex glass of the container without requiring interposed metals which will more readily seal to Pyrex.

8. The combination of claim 7 in which said input electrode is platinum gauze and said shield electrode is platinum which is sputtered on said one opposed surface and peripheral region of said glass frit disk, said electrolyte comprising an aqueous solution of potassium iodide and iodine.

9. The combination of claim 8 in which said leads are constructed of wire having a diameter of the order of 3 to 5 mils, said portion of said wire being formed by flattening said wire to a thickness of .5 mil or less.

10. An electrical readout integrator comprising a container a redox electrolytic solution in said container; a plurality of spaced electrodes within said container comprising an input electrode, a shield electrode, a read-out electrode and a common electrode, said read-out and common electrodes defining an integral compartment; first porous insulating means having two opposed surfaces and an encompassing peripheral surface, said read-out electrode being disposed on one of said opposed surfaces and at least a portion of said peripheral surface; a conductive cup-shaped element contacting said read-out electrode and having a large centrally located aperture in the bottom thereof, said readout electrode and said supporting porous insulating means being firmly wedged into said cup-shaped element to provide a reliable low resistance contact with said readout electrode; second porous insulating means interposed between and in contact with said conductive element and said common electrode to define an integral compartment therebetween and prevent shorts from developing between said electrodes.

11. The combination of claim 10 in which the side of said cup-shaped element is wedged outwardly into intimate contact with the walls of said container to minimize the leakage of electrolyte out of said integral compartment between the wall and said element and to further assure that any electrolyte which will leak along this path will have to pass in intimate contact with said conductive element.

12. The combination of claim 11 in which the side of said cup-shaped element is tapered outwardly from the bottom of said element to provide said wedging action, said peripheral surface being normal to said one opposed surface, the height of the said side being less than the thickness of said insulating means.

13. The combination of claim 12 in which said first porous insulating means comprises a glass frit disk, said second insulating means comprises a quartz paper spacer, and said electrodes are taken from the class consisting of platinum and its noble metal alloys.

14. The combination of 13 further comprising first and second conductive leads respectively connected to said readout and common electrodes to provide externally available connections to said electrodes, said first electrodes passing through said wall in a radial direction directly out of said container thus dispensing with the necessity for providing slots in the periphery of said glass frit disk and quartz paper spacer and alleviating the problem associated with leakage of the electrolyte through said slots.

15. The combinaion of claim 14 in which said electrodes and leads are of platinum, said container is Pyrex glass, said leads being entirely of platinum throughout their length from their correponding electrode to a point external of the container, the portion of said leads traversing said wall being sufficiently thin to expand and contract with the expansion and contraction of the walls of the container during the manufacture of said device and later during its normal usage to thus provide a seal between the platinum conductive leads and the Pyrex glass container without requiring interposed metals which will more readily seal to Pyrex.

16. The combination of claim 15 in which said common electrode is platinum gauze and said readout electrode is platinum which is sputtered on said one opposed surface and peripheral region of said glass frit disk, said electrolyte comprising an aqueous solution of potassium iodide and iodine.

17. The combination of claim 16 in which said leads are constructed of wire having a diameter of the order of 3 to 5 mils, said portion of said wire being formed by flattening said wire to a thickness of .5 mil or less.

No references cited.

JOHN W. HUCKERT, *Primary Examiner.*

J. D. KALLAM, *Assistant Examiner.*